United States Patent
Inoue et al.

(10) Patent No.: US 8,507,713 B2
(45) Date of Patent: Aug. 13, 2013

(54) PIGMENT, METHOD FOR MANUFACTURING THE SAME, PIGMENT DISPERSION, AND YELLOW TONER

(75) Inventors: Kei Inoue, Tokyo (JP); Takayuki Toyoda, Yokohama (JP); Yutaka Tani, Yokohama (JP); Taichi Shintou, Saitama (JP); Yasuaki Murai, Kawasaki (JP); Masashi Hirose, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 527 days.

(21) Appl. No.: 12/760,453

(22) Filed: Apr. 14, 2010

(65) Prior Publication Data

US 2010/0266945 A1 Oct. 21, 2010

(30) Foreign Application Priority Data

Apr. 17, 2009 (JP) ................. 2009-101052

(51) Int. Cl.
*C07C 229/62* (2006.01)
(52) U.S. Cl.
USPC ............................................................ 560/34
(58) Field of Classification Search
USPC ........................................................... 560/34
See application file for complete search history.

(56) References Cited

U.S. PATENT DOCUMENTS

| | | | | |
|---|---|---|---|---|
| 2006/0172215 | A1* | 8/2006 | Kotsugai et al. | 430/108.23 |
| 2007/0215008 | A1* | 9/2007 | Schweikart et al. | 106/496 |

FOREIGN PATENT DOCUMENTS

| | | | |
|---|---|---|---|
| CN | 1214473 | A | 4/1999 |
| CN | 101037545 | A | 9/2007 |
| DE | 102007050193 | A1 | 4/2009 |
| EP | 908789 | A1 | 4/1999 |
| EP | 0908789 | A1 | 4/1999 |
| GB | 2239254 | A | 6/1991 |
| JP | 11-202558 | A | 7/1999 |
| JP | 11-242357 | A | 9/1999 |
| JP | 2003-140399 | A | 5/2003 |
| JP | 2008-122868 | A | 5/2008 |
| KR | 10-2007-0093860 | A | 9/2007 |
| WO | 2009/049758 | A2 | 4/2009 |

OTHER PUBLICATIONS

XP002629756, C :\EPOPROGS\SEA\..\..\..\epodata\seabplo gf\internal.log (3 pages).
U.S. Appl. No. 12/760,324, filed Apr. 14, 2010.

* cited by examiner

*Primary Examiner* — Shawquia Young
(74) *Attorney, Agent, or Firm* — Canon U.S.A., Inc., IP Division

(57) ABSTRACT

A pigment has a compound expressed by Formula (1). The pigment has a number average primary particle size of 30 to 70 nm and has a CuKα characteristic X-ray diffraction spectrum having, when θ represents a Bragg angle, a peak at 2θ±0.20° equal to 10.0° and a peak at 2θ±0.20° equal to 11.1°, the intensity ratio of the 11.1° peak to the 10.0° peak being 0.1 to 0.6.

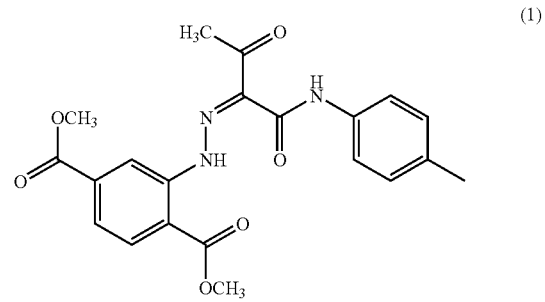
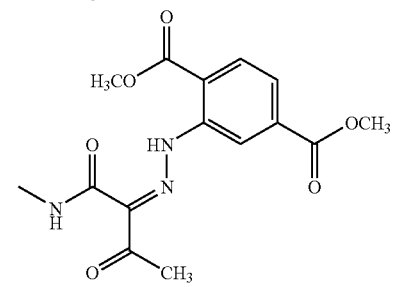

(1)

1 Claim, 1 Drawing Sheet

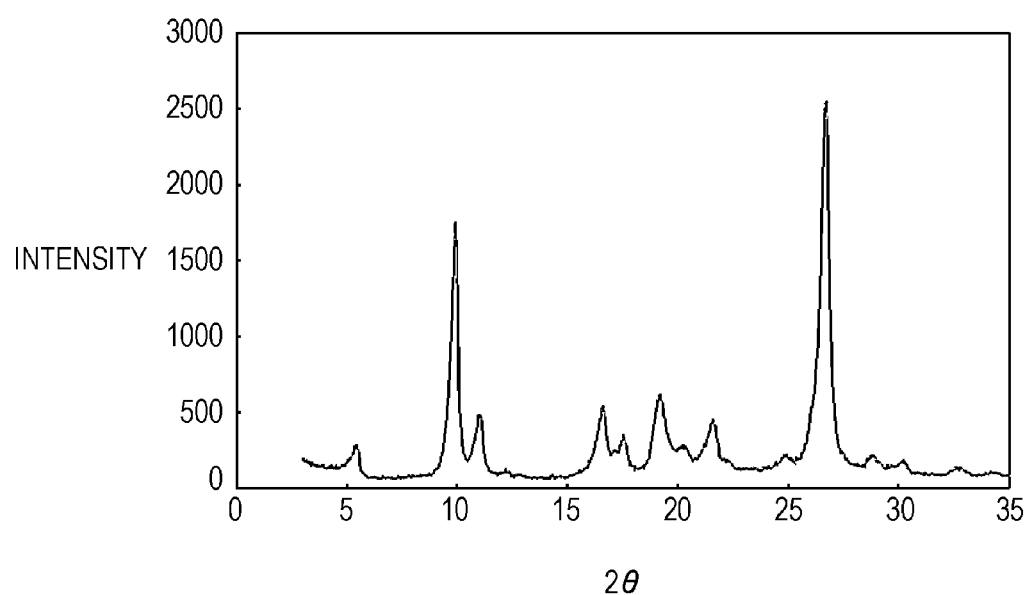

PIGMENT, METHOD FOR MANUFACTURING THE SAME, PIGMENT DISPERSION, AND YELLOW TONER

BACKGROUND OF THE INVENTION

1. Field of the Invention

The present invention relates to a pigment and a method for manufacturing the same. The invention also relates to a yellow toner containing the pigment as a coloring agent and used in recording methods, such as electrophotographic method, electrostatic recording method, magnetic recording method, and toner jet method.

2. Description of the Related Art

Color images are becoming popular and the demand for high-quality images is increasing. In digital full color copy machines and printers, a color image original is subjected to color separation through color filters of blue, green and red, and then a latent image according to the original image is developed with yellow, magenta, cyan and black developers. Accordingly, the coloring agents in the developers are significantly involved in the resulting image quality.

Since yellow coloring agents give the human sense the same impression as other colors, the painting industry requires that yellow coloring agents have high hiding power and high coloring power, and often uses yellow coloring agents having large primary particle sizes. On the other hand, the toner industry requires that coloring agents have high transparency as well as high coloring power, and these are important properties of the coloring agents used in the toner. It has not been considered that coloring agents having large primary particle sizes suitably used in the painting industry can satisfy those requirements at one time.

Japanese Patent Laid-Open No. 11-202558 proposes that C. I. Pigment Yellow 155 be used as a toner coloring agent. According to this patent document, C. I. Pigment Yellow 155 is superior in thermal stability, dispersibility in resins, and chargeability.

Japanese Patent Laid-Open No. 11-242357 proposes that the above issues be solved by appropriately selecting a binding resin to enhance the dispersibility of the coloring agent in the binding resin. For example, by use of a binding resin mainly containing a polyester resin having a specific acid value, even C. I. Pigment Yellow 155, which is difficult to disperse, can be sufficiently dispersed to increase the transparency.

Japanese Patent Laid-Open Nos. 2003-140399 and 2004-212451 propose using C. I. Pigment Yellow 155 in a toner prepared in an aqueous medium. Good transparency can be achieved by maintaining good dispersion of the coloring agent. In addition, this allows easy control of the shape of toner particles, and accordingly, the transfer and cleaning properties of the toner can be improved.

The above-cited documents, however, do not discuss that when C. I. Pigment Yellow 155 having a small primary particle size is dispersed in a medium such as an organic solvent, the viscosity of the dispersion is increased.

SUMMARY OF THE INVENTION

According to an aspect of the present invention, a pigment having a compound expressed by Formula (1) is provided. The pigment has a number average primary particle size of 30 to 70 nm and exhibits a CuKα X-ray diffraction spectrum in which the ratio of the intensity at a Bragg angle (2θ±0.20°) of 11.1° to the intensity at a Bragg angle (2θ±0.20°) of 10.0 deg is 0.1 to 0.6.

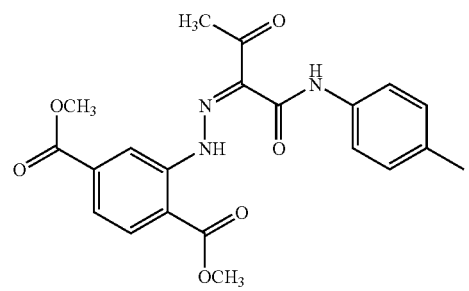

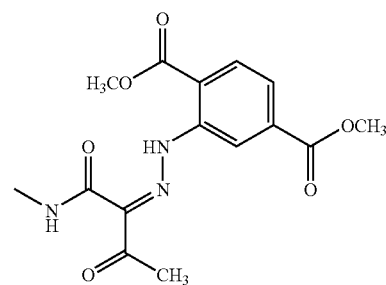

According to another aspect of the present invention, a yellow toner is provided. The yellow toner contains yellow toner base particles containing a binding resin, a coloring agent and a wax component. The coloring agent includes the above pigment.

Further features of the present invention will become apparent from the following description of exemplary embodiments with reference to the attached drawings.

BRIEF DESCRIPTION OF THE DRAWINGS

The FIGURE is a powder X-ray diffraction spectrum of Pigment (a) prepared in Pigment Preparation Example 1.

DESCRIPTION OF THE EMBODIMENTS

The present invention will further be described in detail with reference to exemplary embodiments.

The present inventors have conducted intensive research to solve the above-described issue in the known art and reached the following findings. The inventors have found that a pigment expressed by Formula (1) can be dispersed in a disperse medium such as an organic solvent without increasing the viscosity of its dispersion. The pigment has a CuKα characteristic X-ray diffraction spectrum having, when θ represents a Bragg angle, a peak at 2θ±0.20° equal to 10.0° and a peak at 2θ±0.20° equal to 11.1°, the intensity ratio of the 11.1° peak to the 10.0° peak being 0.1 to 0.6. Since the viscosity of the dispersion of the pigment does not increase, the dispersion is easy to handle, and the dispersibility of the pigment is increased to enhance the coloring power.

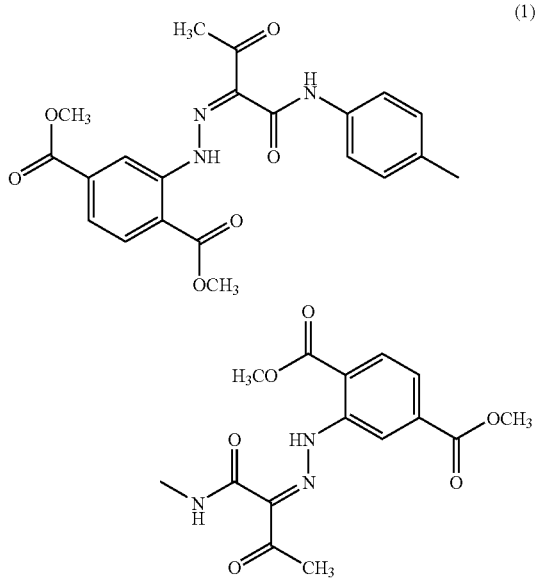

The inventors also found that the use of the pigment as a toner coloring agent improves the handling in the manufacturing process of the toner, and that the use of the pigment maintains a good dispersibility of the coloring agent and thus achieves a yellow color toner having a high coloring power.

The pigment expressed by Formula (1) used in embodiments of the invention comprises, and may even be essentially composed of, a bis(acetoacetanilide)-based yellow coloring agent and is classified in C. I. Pigment Yellow 155.

C. I. Pigment Yellow 155 is superior in lightfastness and heat resistance. As with other azo pigments, however, if C. I. Pigment yellow 155 having a high adhesion and a small particle size is dispersed in a disperse medium to prepare a fine dispersion in order to enhance the coloring power and the transparency, the viscosity of the resulting dispersion is extremely increased and its handling becomes difficult, because the pigment has high affinity among the particles. In addition, the pigment particles are aggregated again, and thereby the coloring power and the transparency are reduced.

The type of C. I. Pigment Yellow 155 used in embodiments of the present invention appropriately controls the adhesion among its molecules in the disperse media such as organic solvents (including polymerizable monomers) with a good dispersibility maintained. Thus, the dispersion of the pigment can keep the viscosity low. Thus, the dispersion of the pigment can keep the viscosity low. Accordingly, the pigment dispersion is easy to handle. In addition, since the particles of the pigment are prevented from aggregating, the resulting pigment dispersion can exhibit high coloring power.

The pigment used in embodiments of the present invention has a number average primary particle size of 30 to 70 nm. Particles having particle sizes of less than 30 nm are difficult to manufacture, and increases the viscosity of the dispersion. In contrast, pigments having a primary particle size of more than 70 nm cannot be dispersed finely because of their large primary particles. Consequently, the coloring power is reduced, and it becomes difficult to stably produce toner base particles in an aqueous medium.

If the ratio ((11.1°/(10.0°)) of the X-ray diffraction intensity at $2\theta \pm 0.20°$ of 11.1° to the intensity at $2\theta \pm 0.20°$ of 10.0° is less than 0.1, the pigment is highly amorphous and has high adhesion among particles. Accordingly, if a pigment having a small particle size is used, the viscosity of the dispersion is significantly increased and the dispersion becomes difficult to handle. In contrast, a pigment having a ratio (11.1°)/(10.0°) of more than 0.6 is difficult to manufacture and cannot be manufactured by known methods or the method of embodiments of the invention. The pigment of embodiments of the invention can have an intensity ratio (11.1°)/(10.0°) of 0.2 to 0.5.

The pigment of embodiments of the present invention can be manufactured by heat-treating the pigment expressed by Formula (1) at a temperature of 145° C. or more in a dry process. Commercially available C. I. Pigment Yellow 155 (for example, Toner Yellow 3GP produced by Clariant) may be heat-treated. Alternatively, the compound (dimethyl aminoterephthalate) expressed by Formula (2) may be diazotized and then coupled with the compound (1,4-bis(acetoacetylamino)benzene) expressed by Formula (3), and the product is heat-treated. The heat treatment may be performed as part of the step of drying the pigment after synthesis.

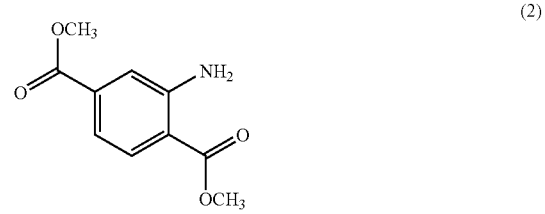 [SMILES: COC(=O)c1ccc(C(=O)OC)c(N)c1]

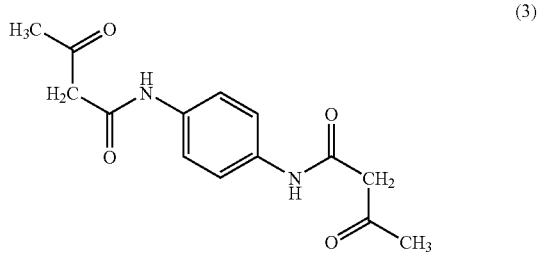

The diazo coupling reaction of the compound of Formula (2) with the compound of Formula (3) can be performed according to the known process. For example, the compound of Formula (2) is dispersed in water and cooled with ice. The dispersion is allowed to react with a diazotization agent, such as sodium nitrite, into a diazonium salt in the presence of an inorganic acid, such as hydrochloric acid or sulfuric acid. The resulting diazonium salt is coupled with the compound of Formula (3) into the pigment expressed by Formula (1) in the presence of an inorganic base, such as sodium hydroxide.

The heat treatment in the manufacturing process of the pigment can be performed in a dry process, for example, in an atmosphere of air or nitrogen, or under reduced pressure. In view of safety, the heat treatment may be performed in an atmosphere of an inert gas, such as nitrogen. If the heat treatment is performed in a wet process, for example, in a solvent, the resulting pigment cannot have desired particle sizes.

The heat treatment can be performed at temperatures of 145° C. or more, and heat treatment performed at a higher temperature of, for example, 160 to 230° C. can advantageously produce the desired pigment in a shorter time. If the heat treatment temperature is lower than 145° C., the pigment is not sufficiently crystallized and does not exhibit the required CuKα X-ray diffraction spectrum. In contrast, if the heat treatment temperature is higher than 230° C., the pigment becomes liable to decompose and results in a degraded color developability, while the process time is reduced.

The heat treatment may be performed with blowing, vibrating, agitating, or decompressing. Any apparatus can be used for the heat treatment as long as it is generally used. Examples of such an apparatus include heaters, such as hot plate, oil bath, oven, electric furnace, and microwave heater, and dryers, such as spray dryer, belt dryer, rotary kiln, conical dryer, and drum dryer.

The heat treatment time is not particularly limited as long as the resulting pigment satisfies the requirements, and can be appropriately controlled by the heat treatment temperature, process volume, heater, and heating environment. The heat treatment time is generally 1 to 36 hours, and many cases of the heat treatment are completed within 24 hours.

The pigment of embodiments of the invention may be dispersed in a disperse medium such as an organic solvent, and the dispersion can be used as a pigment dispersion. The use of the pigment of embodiments of the invention can prevent the viscosity of the pigment dispersion from increasing in comparison with the use of known C. I. Pigment Yellow 155. Accordingly, the dispersion becomes easy to handle. In addition, since the pigment maintains its well-dispersed state, the pigment dispersion can exhibit high coloring power.

The organic solvent used as a disperse medium in the pigment dispersion is not particularly limited and can be selected according to the use of the pigment. Exemplary organic solvents include alcohols, such as methyl alcohol, ethyl alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol, and cyclohexanol; glycols, such as methyl cellosolve, ethyl cellosolve, diethylene glycol, and diethylene glycol monobutyl ether; ketones, such as acetone, methyl ethyl ketone, and methyl isobutyl ketone; esters, such as ethyl acetate, butyl acetate, ethyl propionate, and cellosolve acetate; hydrocarbons, such as hexane, octane, petroleum ether, cyclohexane, benzene, toluene, and xylene; halogenated hydrocarbons, such as carbon tetrachloride, trichloroethylene, and tetrabromoethane; ethers, such as diethyl ether, dimethyl glycol, trioxane, and tetrahydrofuran; acetals, such as methylal and diethyl acetal; organic acids, such as formic acid, acetic acid, and propionic acid; and other organic compounds containing sulfur or nitrogen, such as nitrobenzene, dimethylamine, monoethanolamine, pyridine, dimethylsulfoxide, and dimethylformamide. Among these, for example, low-polarity organic solvents may be used, such as ketones, esters, hydrocarbons, halogenated hydrocarbons and ethers.

A polymerizable monomer may be used as the organic solvent. The polymerizable monomer may be addition-polymerizable or condensation-polymerizable, and addition-polymerizable monomers can be more suitably used. Exemplary polymerizable monomers include styrene monomers, such as styrene, o-, m-, or p-methyl styrene, and o-, m-, or p-ethyl styrene; acrylate monomers, such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl, acrylonitrile, and amide acrylate; methacrylate monomers, such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, amide methacrylate; olefin monomers, such as ethylene, propylene, butylene, butadiene, isoprene, isobutylene, and cyclohexene; vinyl halides, such as vinyl chloride, vinylidene chloride, vinyl bromide, and vinyl iodide; vinyl esters, such as vinyl acetate, vinyl propionate, and vinyl benzoate; vinyl ethers, such as vinyl methyl ether, vinyl ethyl ether, and vinyl isobutyl ether; and vinyl ketones, such as vinyl methyl ketone, vinyl hexyl ketone, and methyl isopropenyl ketone.

The organic solvent acting as a disperse medium may contain a dissolved resin. Examples of such a resin include polystyrene, styrene copolymer, polyacrylic acid, polymethacrylic acid, polyacrylic ester, polymethacrylic acid ester, acrylic acid copolymer, methacryl acid copolymer, polyester, polyvinyl ether, polyvinyl methyl ether, polyvinyl alcohol, and polyvinyl butyral. Polyurethane or polypeptide may be used. These resins may be used singly or in combination.

For example, the pigment dispersion can be prepared as below. A pigment dispersant or a resin is dissolved in a disperse medium, if necessary, and a pigment powder is gradually added into the disperse medium with stirring and sufficiently wetted. Then, a mechanical shear force is applied to the mixture with a disperser, such as ball mill, paint shaker, dissolver, attritor, sand mill, or high speed mill. The pigment thus can be finely dispersed uniformly.

The pigment of embodiments of the invention can be used as the coloring agent of a toner containing toner base particles containing a binding resin, a coloring agent and a wax component. The used of the pigment prevents the increase of the viscosity of the pigment dispersion in a disperse medium. Accordingly, the pigment dispersion can be easy to handle during the manufacture of toner. In addition, since the coloring agent maintains its well-dispersed state, the resulting yellow toner can exhibit high coloring power.

Examples of the binding resin contained in the toner include styrene-acrylic ester copolymer, styrene-methacrylic ester copolymer, polyester resin, epoxy resin, and styrene-butadiene copolymer. These are generally used as binding resins. The toner base particles may be directly produced by polymerization. In this instance, a polymerizable monomer is used for producing the toner base particles. Examples of the polymerizable monomer include styrene monomers, such as styrene, o-, m-, or p-methyl styrene, and o-, m-, or p-ethyl styrene; acrylate monomers, such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and amide acrylate; methacrylate monomers, such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and amide methacrylate; and olefin monomers, such as butadiene, isoprene, and cyclohexene. These monomers may be used singly, or generally in a form of an appropriate mixture prepared so that the theoretical glass transition temperature (Tg) specified in Polymer Handbook 2nd edition, III, pp. 139-192 (John Wiley & Sons, Inc.) can be, for example, 30 to 80° C., preferably 40 to 75° C. If the theoretical glass transition temperature is in these ranges, the toner can be stably stored, and can stably maintain its durability while the resulting images maintain their transparency.

In order to enhance the mechanical strength of the toner particles and control the molecular weight of the toner particles, a crosslinking agent may be added when the binding resin is synthesized.

Examples of the crosslinking agent include bifunctional crosslinking agents, such as divinylbenzene, 2,2-bis(4-acryloxyethoxyphenyl)propane, ethylene glycol diacrylate, 1,3- butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycols #200, #400 and #600, dipropylene glycol diacrylate, polypropylene glycol diacrylate, polyesterified diacrylate, and dimethacrylates corresponding to the above diacrylates.

Trifunctional crosslinking agents may also be used, such as pentaerythritol triacrylate, trimethylolethane triacrylate, trimethylolpropane triacrylate, tetramethylolmethane tetraacrylate, oligoester acrylate, methacrylates corresponding to these acrylates, triallyl cyanurate, triallyl isocyanurate, and triallyl trimellitate.

The crosslinking agent can be used in a proportion of 0.05 to 10 parts by mass, preferably 0.1 to 5 parts by mass, relative to 100 parts by mass of the monomer.

The toner may contain another coloring agent in addition to the pigment of an embodiment of the invention as long as the dispersibility of the pigment is not reduced.

Various types of coloring agents can be used in combination with the pigment, such as condensed azo compounds, isoindolinone compounds, anthraquinone compounds, azo metal complexes, methine compounds, and allyl amide compounds. More specifically, exemplary coloring agents include C. I. Pigment Yellows 12, 13, 14, 15, 17, 62, 74, 83, 93, 94, 95, 97, 109, 110, 111, 120, 127, 128, 129, 147, 151, 154, 168, 174, 175, 176, 180, 181, 191, 194, 213 and 214, C. I. Vat Yellows 1, 3 and 20, mineral fast yellow, navel yellow, naphthol yellow S, Hansa Yellow G, Permanent Yellow NCG, and C. I. Solvent Yellows 9, 17, 24, 31, 35, 58, 93, 100, 102, 103, 105, 112, 162 and 163.

The toner base particles can contain a wax component. Examples of the wax component include paraffin waxes, microcrystalline waxes, petroleum waxes and their derivatives, such as petrolatum, montan waxes and their derivatives, hydrocarbon waxes produced by Fischer-Tropsch process and their derivatives, polyolefin waxes and their derivatives represented by polyethylene, and natural waxes and their derivatives, such as carnauba wax and candelilla wax. The derivatives include oxides, block copolymers with vinyl monomers, and graft-modified forms. Other wax components may be used, such as higher aliphatic alcohols or the like, fatty acids represented by stearic acid and palmitic acid, and their acid amides or esters, hydrogenated castor oil and its derivatives, plant waxes, and animal waxes. These waxes may be used singly or in combination.

The toner of embodiments of the invention may optionally contain a charge control agent. The toner base particles may contain the charge control agent, or the charge control agent may be mixed with the toner base particles. The addition of the charge control agent allows the frictional charge to be optimally controlled according to the development system.

Any known charge control agent may be used, and a charge control agent capable of rapid electrification and capable of stably maintaining a charge quantity can be advantageously used. If the toner base particles are produced by direct polymerization, a charge control agent substantially insoluble in aqueous disperse media and not inhibiting the polymerization can be used.

The charge control agent may control the toner to be in a negatively charged state. Such charge control agents include polymers or copolymers including a sulfonate group or sulfonic acid ester group; salicylic acid derivatives and their metal complexes; monoazo metal compounds; acetyl acetone metal compounds; aromatic oxycarboxylic acids; aromatic mono- or poly-carboxylic acids and their metal salts, anhydrides and esters; phenol derivatives such as bisphenol; urea derivatives; metal-containing naphthoic acid compounds; boron compounds; quaternary ammonium salts; calixarene; and resin-based charge controllers. The charge control agent may control the toner to be in a positively charged state. Such charge control agents include nigrosine-modified compounds prepared from nigrosine and a metal salt of a fatty acid; guanidine compounds; imidazole compounds; 4-hydroxynaphthalene-1-benzyltributylammonium sulfonate; quaternary ammonium salts such as tetrabutylammonium tetrafluoroborate; onium salts such as phosphonium salts similar to quaternary ammonium salts and their lake pigments; triphenylmethane dyes and their lake pigments (prepared using a lake-forming agent, such as phosphotungstic acid, phosphomolybdic acid, phosphotungsten molybdic acid, tannic acid, lauric acid, gallic acid, ferricyanide, or ferrocyanide); and resin-based charge controllers. The above charge control agents may be used singly or in combination.

In an embodiment of the invention, a polar resin, such as polyester resin or a polycarbonate resin, may be used. For example, if a polar resin is added during the polymerization reaction subsequent to the dispersion step when toner base particles are directly produced by suspension polymerization or the like, the added polar resin can be controlled so as to form a thin layer on the surfaces of the toner base particles or to be present with a gradient from the surfaces to the centers of the toner base particles, according to the polarity balance between the polymerizable monomer composition forming the toner base particles and the aqueous disperse medium. By using a polar resin interacting with the coloring agent or the charge control agent, the coloring agent can be present in a favorable state in the toner.

The toner of an embodiment of the invention may contain an inorganic fine powder as a fluidity enhancing agent in addition to the toner base particles. The inorganic fine powder may comprise silica, titanium oxide, alumina, and their complex oxide. Fine powder surface-treated with these materials may be used.

The yellow toner of embodiments of the invention has a weight-average particle size D4 of 4.0 to 8.0 μm. The ratio (D4/D1) of the weight-average particle size D4 to the number-average particle size D1 can be 1.35 or less. The weight-average particle size D4 may be in the range of 4.9 to 7.5 μm and the D4/D1 ratio is 1.30 or less. The yellow toner having a weight-average particle size D4 in this range can advantageously prevent fog, exhibit superior transfer properties, and prevent scattering of characters and line images, thus producing highly precise images.

The weight-average particle size D4 and the number-average particle size D1 of the yellow toner are controlled depending on the manufacturing process of the toner base particles. When the toner base particles are produced by suspension polymerization, for example, the particle size of the toner can be controlled by controlling the concentration of the dispersant used for preparing the aqueous disperse medium and the agitation speed or time for reaction.

The yellow toner of an embodiment of the invention may have an average circularity (measured with a flow particle image analyzer) of 0.960 to 0.995, and preferably 0.970 to 0.990. Such a toner exhibits improved transfer properties.

The toner base particles can be produced by any process, and advantageously by suspension polymerization, emulsion polymerization, suspension granulation, or granulation in an aqueous medium. It has a technical issue in view of developability that a large amount of wax component is added to the toner base particles in a process for manufacturing the toner by a general pulverization. By granulating the toner base particles in an aqueous medium, the wax component can be prevented from being exposed at the surfaces of the toner particles even if a large amount of wax component is used. In particular, suspension polymerization allows the wax component to be confined within the toner particles and thus increases the development stability, and is advantageous in cost efficiency because it does not use solvents. In addition, by precisely controlling the shape of the toner particles, substantially the same amount of coloring agent is confined within the toner base particles. Consequently, the coloring agent acts on the charging properties uniformly, so that the developability and the transfer properties can be improved with a good balance.

For manufacturing the toner base particles by suspension polymerization, a polymerizable monomer, the pigment of an embodiment of the invention, a polymerization initiator, and optionally other additives are mixed to prepare a polymerizable monomer composition. The polymerizable monomer composition is dispersed in an aqueous medium to granulate the polymerizable monomer composition into particles. The polymerizable monomer in the particles is polymerized in the aqueous medium to produce the toner base particles. The polymerization initiator may be added in the aqueous medium after the granulation. The polymerizable monomer composition can be prepared by dispersing the pigment in a first polymerizable monomer (or part of the polymerizable monomer) and then mixing the dispersion with a second polymerizable monomer (or the rest of the polymerizable monomer). By sufficiently dispersing the pigment in the first polymerizable monomer and then mixing the dispersion with the second polymerizable monomer together with other toner constituents, the pigment can be present in a well-dispersed state in the toner base particles. A pigment satisfying the above-described requirements can restrain the increase in viscosity of the pigment dispersion to some extent. In particular, if the viscosity is increased, a process step to sufficiently disperse the pigment in the first polymerizable monomer is performed.

The analyses for evaluating the properties of the pigment and yellow toner of embodiments of the invention will now be described. The measurements used for evaluation of the pigment and yellow toner are performed by the following procedures.

(1) Number Average Primary Particle Size Dm of Pigment and Shape of Pigment Particles The pigment is directly sampled on a collodion film-laminated mesh and observed at a magnification of 50,000 times through a transmission electron microscope H-800 (manufactured by Hitachi). After the observation, the information of the observation image is input to an image analyzer Luzex 3 (manufacture by Nireco) and the particle image is binarized to obtain the projected particle area. The equivalent circle diameter of each particle is calculated from the following equation using the obtained projected particle area, and the number average primary particle size Dm of the pigment is obtained from the equivalent circle diameter.

$$\text{Equivalent circle diameter} = (\text{projected particle area}/\pi)^{1/2} \times 2$$

(2) X-ray Diffraction of Pigment Powder

Samples are subjected to CuKα X-ray diffraction with a powder X-ray diffractometer RINT 2100 (manufacture by Rigaku) at Bragg angles (2θ±0.20°) in the range of 3° to 35°, and the ratio of the intensity at 2θ of 11.1° to the intensity at 2θ of 10.0° is calculated from the spectrum.

(3) Viscosity of Pigment Dispersion Liquid

The viscosity at a share rate in the range of 0 to 100 s$^{-1}$ is measured with a viscoelasticity analyzer Physica MCR 300 (available from Anton Paar, cone/plate geometry: 75 mm, 1°). The viscosities shown in Table 2 are measurements at a shear rate of 10 s$^{-1}$.

(4) Weight-Average Particle Size D4 and Number Average Particle Size D1 of Toner A multisizer (manufactured by Coulter) is connected with a personal computer and an interface (manufactured by Nikkaki) outputting number distribution and volume distribution. An aqueous solution of 1% NaCl is prepared as the electrolyte from high-grade sodium chloride. ISOTON R-II (available from Coulter Scientific Japan) may be used. The detail of the measurement procedure is described in the catalog (version of February, 2002) of the Coulter multisizer and the operational manual of the multisizer, issued by Coulter. For example, the measurement is performed as below.

To 100 to 150 mL of the electrolyte solution is added 2 to 20 mg of a sample. The suspension of the sample in the electrolyte is dispersed for about 1 to 3 minutes in an ultrasonic distributor. The resulting dispersion is measured for the volume and number of toner particles of 2.0 to 64.0 μm through a 100 μm aperture of the Coulter multisizer. The measurement data are divided into 16 channels, and the weight-average particle size D4, the number average particle size D1, and D4/D1 are calculated.

(5) Average Circularity of Toner

The measurement was performed with a flow particle image analyzer FPIA-2100 (manufactured by Toa Medical Electronics) and calculated from the following equation:

$$\text{Equivalent circle diameter} = (\text{projected particle area}/\pi)^{1/2} \times 2$$

$$\text{Circularity} = (\text{circumference of a circle having an area equal to the projected particle area})/(\text{circumferential length of projected particle image})$$

The projected particle area mentioned herein refers to the area of a binarized toner particle image, and the circumferential length of the projected particle image refers to the length of an outline drawn by connecting edge points of the toner particle image. The circularity is a value indicating the unevenness of the surfaces of particles. Completely spherical toner particles have a circularity of 1.000. As the surfaces of particles become more complicated, the circularity is reduced. The average circularity was obtained by calculating the arithmetic mean of the circularities of particles.

EXAMPLES

Pigment Preparation Example 1

In 200 parts by mass of water was dispersed 41.8 parts by mass of dimethyl aminoterephthalate, and 70 parts by mass of 31% HCl aqueous solution was added to the dispersion at 10° C., followed by stirring for 2 hours. Then, 35 parts by mass of 40% sodium nitrite aqueous solution was added. After stirring for 1.5 hours, sulfamic acid was added to decompose the excess of nitrous acid. The pH of the reaction mixture was adjusted with stirring to 4.5 with 4 mol/L sodium acetate solution to yield a solution of diazonium salt.

Aside from the above, 430 parts by mass of 33% NaOH aqueous solution was added to 450 parts by mass of water, and then 27.6 parts by mass of 1,4-bis(acetoacetylamino)benzene was added and dissolved with stirring. After 170 parts by mass of ice was added to the resulting solution, 263 parts by mass of glacial acetic acid was added to yield a coupler solution.

The coupler solution was dropped into a diazonium salt solution for a coupling reaction over a period of 40 minutes with stirring, and the reaction mixture was stirred for another two hours.

The resulting coloring agent slurry was heated to 98° C. with steam and stirred at this temperature for 1 hour. Then, the slurry was filtered and washed with water and thus a coloring agent paste was prepared. The resulting coloring agent paste was dispersed in methanol. After being stirred for 2 hours, the dispersion was filtered and washed with water, and dried at reduced pressure and 80° C. to pulverize. The resulting coloring agent was heat-treated at 200° C. for 3 hours in an oven to yield Pigment (a). Pigment (a) was subjected to powder X-ray diffraction, and the results are as below.

Results of Powder X-Ray Diffraction of Pigment (a)

The intensity is represented by s (strong), m (middle) or w (weak).

| $2\theta$ | Intensity | Relative intensity |
|---|---|---|
| 5.4° | w | 5% |
| 9.9° | s | 56% |
| 11.0° | m | 29% |
| 16.6° | m | 16% |
| 19.3° | m | 24% |
| 21.6° | w | 27% |
| 26.7° | s | 100% |

Pigment Preparation Example 2

Pigment (b) was prepared in the same manner as in Pigment Preparation Example 1 except that the heat treatment in the oven was performed at 160° C. for 3 hours.

Pigment Preparation Example 3

Pigment (c) was prepared in the same manner as in Pigment Preparation Example 1 except that the heat treatment in the oven was performed at 145° C. for 6 hours.

Pigment Preparation Example 4

A coloring agent paste was prepared in the same manner as in Pigment Preparation Example 1, and the paste was dispersed in methanol. After being stirred for 2 hours, the dispersion was filtered and washed with water, followed by drying at reduced pressure and 160° C. The product was pulverized to yield Pigment (d).

Pigment Preparation Example 5

Pigment (e) was prepared in the same manner as in Pigment Preparation Example 1 except that the heat treatment in the oven was performed at 160° C. for 90 hours.

Pigment Preparation Example 6

Commercially available C. I. Pigment Yellow 155 (Toner Yellow 3GP produced by Clariant) was heat-treated in an oven at 160° C. for 3 hours to yield Pigment (f).

Pigment Preparation Comparative Example 1

In 200 parts by mass of water was dispersed 41.8 parts by mass of dimethyl aminoterephthalate, and 70 parts by mass of 31% HCl aqueous solution was added to the dispersion at 10° C., followed by stirring for 2 hours. Then, 35 parts by mass of 40% sodium nitrite aqueous solution was added. After stirring for 1.5 hours, sulfamic acid was added to decompose the excess of nitrous acid. The pH of the reaction mixture was adjusted with stirring to 4.5 with 4 mol/L sodium acetate solution to yield a solution of diazonium salt.

Aside from the above, 430 parts by mass of 33% NaOH aqueous solution was added to 450 parts by mass of water, and then 27.6 parts by mass of 1,4-bis(acetoacetylamino)benzene was added and dissolved with stirring. After 170 parts by mass of ice was added to the resulting solution, 263 parts by mass of glacial acetic acid was added to yield a coupler solution.

The coupler solution was dropped into a diazonium salt solution for a coupling reaction over a period of 40 minutes with stirring, and the reaction mixture was stirred for another two hours.

The resulting coloring agent slurry was heated to 98° C. with steam and stirred at this temperature for 1 hour. Then, the slurry was filtered and washed with water and thus a coloring agent paste was prepared. The resulting coloring agent paste was dispersed in methanol. After being stirred for 2 hours, the dispersion was filtered and washed with water, and dried at reduced pressure and 80° C. The product was pulverized to yield Pigment (g) for comparison. The X-ray diffraction spectrum of Pigment (g) did not exhibit a clear peak at an angle $2\theta$ of 11.1°.

Results of Powder X-Ray Diffraction of Pigment (g)

The intensity is represented by s (strong), m (middle) or w (weak).

| $2\theta$ | Intensity | Relative intensity |
|---|---|---|
| 10.0° | s | 42% |
| 16.6° | m | 10% |
| 20.2° | m | 11% |
| 26.6° | s | 100% |

Pigment Preparation Comparative Example 2

In 200 parts by mass of water was dispersed 41.8 parts by mass of dimethyl aminoterephthalate, and 70 parts by, mass of 31% HCl aqueous solution was added to the dispersion at 10° C., followed by stirring for 2 hours. Then, 35 parts by mass of 40% sodium nitrite aqueous solution was added. After stirring for 1.5 hours, sulfamic acid was added to decompose the excess of nitrous acid. The pH of the reaction mixture was adjusted with stirring to 4.5 with 4 mol/L sodium acetate solution. To this reaction mixture was added an emulsion prepared by mixing 10 parts by mass of o-dichlorobenzene and 1 part by mass of surfactant (Emulgen 911 produced by Kao) to an appropriate amount of water to yield a diazonium salt solution.

Aside from the above, 430 parts by mass of 33% NaOH aqueous solution was added to 450 parts by mass of water, and then 27.6 parts by mass of 1,4-bis(acetoacetylamino)benzene was added and dissolved with stirring. After 170 parts by mass of ice was added to the resulting solution, 263 parts by mass of glacial acetic acid was added to yield a coupler solution.

The coupler solution was dropped into a diazonium salt solution for a coupling reaction over a period of 40 minutes with stirring, and the reaction mixture was stirred for another two hours. The reaction mixture was further stirred for an hour at 80° C. After filtration, the product was washed with cold water and dried at reduced pressure.

To 71.6 parts by mass of the resulting coarse coloring agent was added 570 parts by mass of dimethylformamide, and the mixture was stirred at 150° C. for 3 hours. After being cooled to a temperature of 80 to 100° C. and filtered, the mixture was washed with methanol, dried, and pulverized to yield Pigment (h) for comparison.

Pigment Preparation Comparative Example 3

Pigment (i) for comparison was prepared in the same manner as in Pigment Preparation Example 1 except that the coloring agent was heat-treated in an oven at 80° C. for 12 hours. The X-ray diffraction spectrum of Pigment (i) did not exhibit a clear peak at an angle 2θ of 11.1°.

Pigment Preparation Comparative Example 4

Pigment (j) for comparison was prepared in the same manner as in Pigment Preparation Example 1 except that the heat treatment in the oven was performed at 120° C. for 3 hours. The X-ray diffraction spectrum of Pigment (j) did not exhibit a clear peak at an angle 2θ of 11.1°.

Pigment Preparation Comparative Example 5

Pigment (k) for comparison was prepared in the same manner as in Pigment Preparation Example 1 except that the coloring agent was heat-treated in an oven at 140° C. for 3 hours.

Table 1 shows the results of analyses of the prepared pigments, C. I. Pigment Yellow 155 (Toner Yellow 3GP produced by Clariant) and Novoperm Yellow 4G (produced by Clariant).

TABLE 1

| | Pigment No. | Number average particle size Dm (μm) | Shape | X-ray diffraction (11.1°/10.0°) |
|---|---|---|---|---|
| Pigment preparation example 1 | a | 49 | Rod-needle | 0.51 |
| Pigment preparation example 2 | b | 52 | Rod-needle | 0.29 |
| Pigment preparation example 3 | c | 60 | Rod-needle | 0.37 |
| Pigment preparation example 4 | d | 55 | Rod-needle | 0.25 |
| Pigment preparation example 5 | e | 64 | Rod-needle | 0.60 |
| Pigment preparation example 6 | f | 54 | Rod-needle | 0.31 |
| Pigment preparation comparative example 1 | g | 50 | Rod-needle | 11.1° No peek |
| Pigment preparation comparative example 2 | h | 129 | Granular-rod | 0.39 |
| Pigment preparation comparative example 3 | i | 56 | Rod-needle | 11.1° No peek |
| Pigment preparation comparative example 4 | j | 60 | Rod-needle | 11.1° No peek |
| Pigment preparation comparative example 5 | k | 59 | Rod-needle | 0.09 |
| Toner Yellow 3GP | l | 63 | Rod-needle | 11.1° No peek |
| Novoperm Yellow 4G | m | 135 | Granular-rod | 0.39 |

Pigment Dispersion Preparation Example 1

Styrene monomer: 120 parts by mass
Pigment (b): 12 parts by mass
The mixture of the above constituents was dispersed with an attritor (manufactured by Mitsui Mining) for 3 hours to yield pigment dispersion liquid (A) being a pigment dispersion.

Pigment Dispersion Preparation Examples 2 and 3

Pigment dispersion liquids (B) and (C) were prepared in the same manner as in Pigment Dispersion Preparation Example 1 except that the compositions were changed according to Table 2.

Pigment Dispersion Preparation Example 4

Ethyl acetate: 180 parts by mass
Pigment (b): 12 parts by mass
The mixture of the above constituents was dispersed with an attritor to yield Pigment dispersion liquid (D).

Pigment Dispersion Preparation Comparative Examples 1 to 4 and 6 and 7

Pigment dispersion liquids (E) to (H) and (J) and (K) were prepared for comparison in the same manner as in Pigment Dispersion Preparation Example 1 except that the compositions were changed according to Table 2.

Pigment Dispersion Preparation Comparative Example 5

Pigment dispersion liquid (I) was prepared for comparison in the same manner as in Pigment Dispersion Preparation Example 4 except that the composition was changed according to Table 2.

Table 2 shows the pigments and disperse media used for preparing the pigment dispersion liquids, and the evaluation results of the pigment dispersion liquids. The pigment dispersion liquids were evaluated according to the following criteria.

Ease of Handling

The ease of handling was visually evaluated according to the following three levels:

A: The pigment dispersion liquid was not attached to, or much less attached to the inner wall of an apparatus.
B: The pigment dispersion liquid was attached to the inner wall to same extent, but was able to be handled.
C: The pigment dispersion liquid was seriously attached to the inner wall and was difficult to handle.

Coloring Power

The pigment dispersion was applied onto art paper by a bar code method (Bar No. 10) and dried for 24 hours in the air. The image density OD (Y) of the resulting sample was measured with a reflection densitometer RD918 (manufactured by Macbeth). The coloring power was evaluated according to the following criteria. In this instance, when the image density OD (Y) was 1.5 or more, the coloring power was determined to be good.

A: $OD(Y) \geq 1.6$
B: $1.5 \leq OD(Y) < 1.6$
C: $OD(Y) < 1.5$

TABLE 2

| | Pigment dispersion No. | Pigment No. | Disperse medium | Dispersion viscosity (mPa · s) | Handling | Coloring power |
|---|---|---|---|---|---|---|
| Dispersion preparation example 1 | A | b | Styrene | 1539 | B | A(1.65) |
| Dispersion preparation example 2 | B | a | Styrene | 675 | A | B(1.53) |
| Dispersion preparation example 3 | C | c | Styrene | 1865 | B | A(1.63) |
| Dispersion preparation example 4 | D | b | Ethyl acetate | 2092 | B | A(1.62) |
| Dispersion preparation comparative example 1 | E | g | Styrene | 2621 | C | B(1.51) |
| Dispersion preparation comparative example 2 | F | h | Styrene | 717 | A | C(1.39) |
| Dispersion preparation comparative example 3 | G | i | Styrene | 2674 | C | B(1.50) |
| Dispersion preparation comparative example 4 | H | j | Styrene | 2220 | C | B(1.52) |
| Dispersion preparation comparative example 5 | I | g | Ethyl acetate | 4087 | C | B(1.51) |
| Dispersion preparation comparative example 6 | J | l | Styrene | 2752 | C | B(1.51) |
| Dispersion preparation comparative example 7 | K | m | Styrene | 736 | A | C(1.39) |

As shown in Table 2, the dispersions containing the pigments satisfying the requirements of the invention showed that the viscosity was reduced to improve the ease of handling, and that the coloring power was good.

Toner Preparation Example 1

In a 2 L four-neck flask equipped with a high-speed agitator TK homomixer (manufactured by Tokushu Kika Kogyo) were added 710 parts by mass of ion-exchanged water and 450 parts by mass of 0.1 mol/L $Na_3PO_4$ aqueous solution. The mixture was heated to 60° C. with stirring at a rotational speed of 12000 rpm. To the mixture gradually added was 68 parts by mass of 1.0 mol/L $CaCl_2$ aqueous solution to prepare an aqueous disperse medium containing a small amount of $Ca_3(PO_4)_2$ as a water-insoluble dispersion stabilizer.

Pigment dispersion liquid (A): 132 parts by mass
Styrene monomer: 46 parts by mass
n-Butyl acrylate monomer: 34 parts by mass
Polar resin: 10 parts by mass
(Polycondensate of propylene oxide-modified bisphenol A and isophthalic acid (Tg=65° C., Mw=10000, Mn=6000))
Ester wax: 25 parts by mass
(DSC measurement maximum endothermic peak temperature=70° C., Mn=704)
Salicylic acid ammonium compound: 2 parts by mass
(Bontron E-88 produced by Orient Chemical Industries)
Divinylbenzene monomer: 0.1 parts by mass The above listed materials were uniformly dissolved or dispersed with TK homomixer at a rotational speed of 5000 rpm, at 60° C. In the mixture was dissolved 10 parts by mass of polymerization initiator 2,2'-azobis(2,4-dimethylvaleronitrile) to prepare a polymerizable monomer composition. The polymerizable monomer composition was added to the aqueous disperse medium and granulated at a constant rotational speed of 12000 rpm for 15 minutes. The high-speed agitator was replaced with a propeller stirring blade, and the polymerization was continued at 60° C. for 5 hours and was further continued at 80° C. for 8 hours. After the completion of polymerization, the unreacted monomer was evaporated at 80° C. under reduced pressure, and the product was cooled to 30° C. to yield a dispersion liquid of polymer fine particles.

The dispersion of the polymer fine particles was placed in a cleaned container, and dilute hydrochloric acid was added in the container with stirring. The reaction mixture with a pH of 1.5 was stirred for 2 hours to dissolve compounds of phosphoric acid and calcium, including $Ca_3(PO_4)_2$. Then, the solid phase of the product was separated from the liquid phase through a filter to yield a polymer fine powder. The polymer powder was added to water and dispersed by stirring. The dispersion was separated into a solid phase and a liquid phase through a filter. Dispersion and solid-liquid separation of the polymer fine powder were repeated until compounds of phosphoric acid and calcium including $Ca_3(PO_4)_2$ were sufficiently removed. Subsequently, the polymer fine powder finally subjected to solid-liquid separation was sufficiently dried with a dryer to yield yellow toner base particles.

To 100 parts by mass of the resulting yellow toner base particles were mixed 1.0 part by mass of hydrophobic silica fine powder (number average primary particle size: 7 nm) surface-treated with hexamethyldisilazane, 0.15 parts by mass of rutile-type titanium oxide fine powder (number average primary particle size: 45 nm), and 0.5 parts by mass of rutile-type titanium oxide fine powder (number average primary particle size: 200 nm) for 5 minutes in a dry process using a Henschel mixer (manufactured by Mitsui Mining) to yield yellow toner (1).

Toner Preparation Examples 2 and 3

Yellow toners (2) and (3) were prepared in the same manner as in Toner Preparation Example 1 except that the pigment dispersion liquid was replaced as shown in Table 3.

Toner Preparation Example 4

Mixing

The following materials were mixed and dispersed for 24 hours in a ball mill to yield 200 parts by mass of toner composition liquid.
Pigment dispersion liquid (D): 96.0 parts by mass
Polar resin: 85.0 parts by mass (Saturated polyester, polycondensate of propylene oxide-modified bisphenol A and phthalic acid (Tg=75.9° C., Mw=11000, Mn=4200, acid value=11 mg KOH/g))

Hydrocarbon wax: 9.0 parts by mass
(Fischer-Tropsch wax, DSC measurement maximum endothermic peak temperature=80° C., Mw=750)

Salicyl acid aluminum compound: 2.0 parts by mass
(Bontron E-88 produced by Orient Chemical Industries)

Ethyl acetate (solvent): 10.0 parts by mass

Dispersion and Suspension

The following materials were mixed for 24 hours in a ball mill to dissolve carboxymethyl cellulose, thus preparing an aqueous medium.

Calcium carbonate (coated with acrylic acid copolymer): 20.0 parts by mass

Carboxymethyl cellulose: 0.5 parts by mass
(Cellogen BS-H, produced by Dai-ichi Kogyo Seiyaku)

Ion-exchanged water: 99.5 parts by mass.

The resulting aqueous medium in an amount of 1200 g was placed in TK Homomixer, and 1000 g of toner composition liquid was added with stirring with the rotational blade rotating at a peripheral speed of 20 m/s. The mixture was stirred at a constant temperature of 25° C. for 1 minute to yield a suspension.

Removal of Solvent

The removal of the solvent was started by forcibly renewing the gas phase over the surface of 2200 g of the suspension prepared in the above dispersion and suspension step while the suspension was stirred at a peripheral speed of 45 m/min using a full zone blade (manufactured by shinko Pantec) with the temperature kept at 40° C. In this step, 75 g of 1% ammonia water was added as an ionic substance 15 minutes after starting the removal of the solvent, and subsequently, 25 g of the same ammonia water was added 1 hour after starting the removal of the solvent. Further, 25 g of the same ammonia water was added 2 hours after starting the removal of the solvent, and finally, 25 g of ammonia water was added 3 hours after starting the removal of the solvent. Hence, the total amount of 1% ammonia water added was 150 g. The suspension was allowed to stand at a constant temperature of 40° C. for 17 hours after starting the removal of the solvent. The solvent (ethyl acetate) was thus removed from the suspension to yield a toner dispersion liquid.

Cleaning and Dehydration

To 300 parts by mass of the resulting toner dispersion liquid was added 80 parts by mass of 10 mol/L hydrochloric acid. After being neutralized with 0.1 mol/L sodium hydroxide solution, the dispersion was washed with ion-exchanged water four times by suction filtration to yield a toner cake. The toner cake was dried in a vacuum dryer, and subsequently screened through a sieve having openings of 45 μm to yield yellow toner base particles. Then, Yellow toner (4) was prepared using these toner base particles in the same manner as in Toner Preparation Example 1.

Toner Preparation Comparative Examples 1 to 3

Yellow toners (5) to (7) were prepared in the same manner as in Toner Preparation Example 1 except that the pigment dispersion liquid was replaced as shown in Table 3.

The coloring power of each toner was evaluated as below. A commercially available laser printer (LBP-2510, manufactured by Canon) was used for evaluation. First, solid images were formed on transfer paper by varying the amount of toner deposited from 0.1 to 1.0 mg/cm$^2$ under the conditions of normal temperature and normal pressure (23.5° C., 60% RH). The image densities of the solid images were measured with Macbeth reflection densitometer RD918 (manufactured by Macbeth) to obtain the relationship between the amount of toner on the transfer paper and the image density. The coloring power was relatively evaluated by the image density (OD (Y)) when the amount of toner deposited on transfer paper was 0.5 mg/cm$^2$. The evaluation criteria were below. When the image density OD (Y) was 1.3 or more, the coloring power was determined to be good.

A: OD(Y)≧1.4
B: 1.3≦OD(Y)<1.4
C: OD(Y)<1.3

TABLE 3

| Toner | Pigment dispersion | Toner preparation process | D4(μm) | D4/D1 | Average circularity | Coloring power |
|---|---|---|---|---|---|---|
| 1 | A | Suspension polymerization | 6.0 | 1.22 | 0.981 | A(1.47) |
| 2 | B | Suspension polymerization | 6.2 | 1.24 | 0.980 | B(1.36) |
| 3 | C | Suspension polymerization | 6.1 | 1.23 | 0.979 | A(1.45) |
| 4 | D | Suspension granulation | 7.1 | 1.31 | 0.962 | B(1.38) |
| 5 | E | Suspension polymerization | 6.9 | 1.35 | 0.973 | C(1.26) |
| 6 | F | Suspension polymerization | 7.3 | 1.41 | 0.978 | C(1.27) |
| 7 | H | Suspension polymerization | 7.0 | 1.36 | 0.975 | C(1.26) |

Accordingly, the examples show that embodiments according to the present invention may solve an issue with viscosity of a pigment dispersion by providing a pigment that can be dispersed in a disperse medium such as an organic solvent without increasing the viscosity of the dispersion. Dispersions containing such a pigment are easy to handle, and the pigment can be dispersed easily in disperse media. Consequently, the dispersibility of the coloring agent can be increased in the toner base particles, and the coloring power of the toner can be enhanced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-101052 filed Apr. 17, 2009, which is hereby incorporated by reference herein in its entirety.

What is claimed is:

1. A method for manufacturing a pigment comprising a compound expressed by Formula (1)

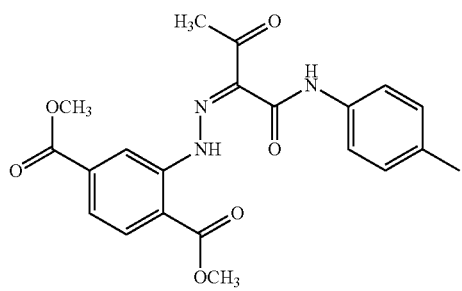

(1)

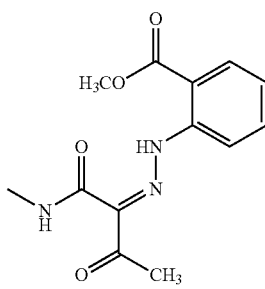

the method comprising:

diazotizing a compound expressed by Formula (2):

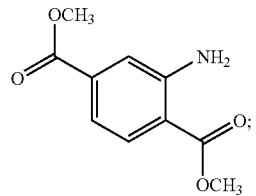

(2)

coupling the product of the diazotization with a compound expressed by Formula (3):

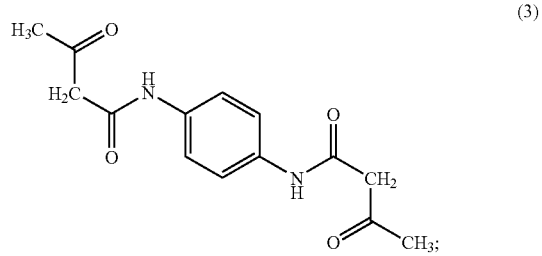 [SMILES: CC(=O)CC(=O)Nc1ccc(NC(=O)CC(C)=O)cc1]

(3)

and heat-treating the compound produced by the coupling at a temperature of 145° C. or more in a dry process, wherein the pigment has a number average primary particle size of 30 to 70 nm, and has a CuKα characteristic X-ray diffraction spectrum having, when θ represents a Bragg angle, a peak at 2θ±0.20° equal to 10.0° and a peak at 2θ±0.20° equal to 11.1°, the intensity ratio of the 11.1° peak to the 10.0° peak being 0.1 to 0.6.

* * * * *